US008060617B2

(12) United States Patent  (10) Patent No.: US 8,060,617 B2
Moon  (45) Date of Patent: Nov. 15, 2011

(54) RESERVING NETWORK RESOURCES DURING SCHEDULING OF MEETING EVENT

(75) Inventor: Billy Gayle Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 12/339,439

(22) Filed: Dec. 19, 2008

(65) Prior Publication Data

US 2010/0161800 A1   Jun. 24, 2010

(51) Int. Cl.
 *G06F 15/173* (2006.01)
(52) U.S. Cl. .................. 709/226; 709/229; 370/468
(58) Field of Classification Search .............. 709/229, 709/226; 370/352, 260, 468; 379/202.01, 379/205.01
See application file for complete search history.

(56) References Cited

U.S. PATENT DOCUMENTS

| 5,646,986 | A | 7/1997 | Sahni et al. | |
|---|---|---|---|---|
| 7,889,851 | B2 * | 2/2011 | Shah et al. | 379/202.01 |
| 2003/0028656 | A1 * | 2/2003 | Babka | 709/229 |
| 2005/0174951 | A1 * | 8/2005 | Schrader et al. | 370/260 |
| 2007/0133438 | A1 * | 6/2007 | Shaffer et al. | 370/260 |
| 2008/0049922 | A1 * | 2/2008 | Karniely | 379/205.01 |
| 2008/0112337 | A1 * | 5/2008 | Shaffer et al. | 370/260 |
| 2009/0109959 | A1 * | 4/2009 | Elliott et al. | 370/352 |

FOREIGN PATENT DOCUMENTS

WO   WO 2006/065148 A1   6/2006

OTHER PUBLICATIONS

"Cisco Telepresence Q and A" Mar. 2007 [online], [retrieved Oct. 15, 2008]. Retrieved from the Internet: <URL: http://www.cisco.com/en/US/prod/collateral/ps7060/ps8329/ps8330/ps8333/prod_qas0900aecd80717d8f.pdf>, pp. 1-8.
Wikipedia-Quality of Service [online], [retrieved Nov. 18, 2008]. Retrieved from the Internet: <URL: http://en.wikipedia.org/w/index.php?title=Quality_of_service&printable=yes>, pp. 1-8.
Schill et al., "Design and Evaluation of an Advance Reservation Protocol on top of RSVP", IFIP Conference Proceedings: vol, 121, Proceedings of the IFIP TC6/WG6.2 Fourth International Conference on Broadband Communications: The future of telecommunications, 1998 [online], [retrieved Mar. 16, 2009]. Retrieved from the Internet: <URL: http://citeseerx.ist.psu.edu/viewdoc/download-?doi=10.1.1.49.4676&rep=rep1&type=pdf>, pp. 1-14.

* cited by examiner

*Primary Examiner* — Jungwon Chang
(74) *Attorney, Agent, or Firm* — Leon R. Turkevich

(57) ABSTRACT

In one embodiment, a method comprises receiving a request for scheduling a meeting event between client endpoint devices in an Internet Protocol (IP) based network, the meeting event having a starting time and duration, the meeting event requiring identifiable network resources from the network; determining whether the network will have available network capacity to supply the identifiable network resources during the meeting event; and selectively reserving the identifiable network resources for the meeting event, from the available network capacity, based on determining the network will have the available network capacity during the meeting event.

22 Claims, 7 Drawing Sheets

RESERVING NETWORK RESOURCES DURING SCHEDULING OF MEETING EVENT

TECHNICAL FIELD

The present disclosure generally relates to network-based meeting scheduling, and allocation of network resources for a meeting conducted via a data network such as the Internet.

BACKGROUND

Computer-based calendars are used by individuals and organizations to schedule meetings and reserve meeting rooms. Such meetings often rely on network-based communications, for example video conference, voice conference, etc. A conference system typically relies on provisioning of network resources, at the time of deployment, that are dedicated exclusively to the conference system. The Cisco® Unified Meetingplace system is a telephone conference system that requires provisioning of network resources, at the time of deployment, that are dedicated exclusively to the Cisco® Unified Meetingplace system. The Cisco® TelePresence system is network-based video conference system that also requires provisioning of network resources, at the time of deployment, that are dedicated exclusively to the Cisco® TelePresence system.

The Cisco® TelePresence system reserves bandwidth and quality of service from the dedicated network resources at the time a TelePresence conference is initiated. The Cisco® WebEx Web Conferencing System also reserves bandwidth at the time a web-based conference is initiated. The Cisco® Unified Meetingplace system, the Cisco® TelePresence system, and the Cisco® WebEx Web Conferencing System each are commercially available from Cisco Systems, San Jose, Calif.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
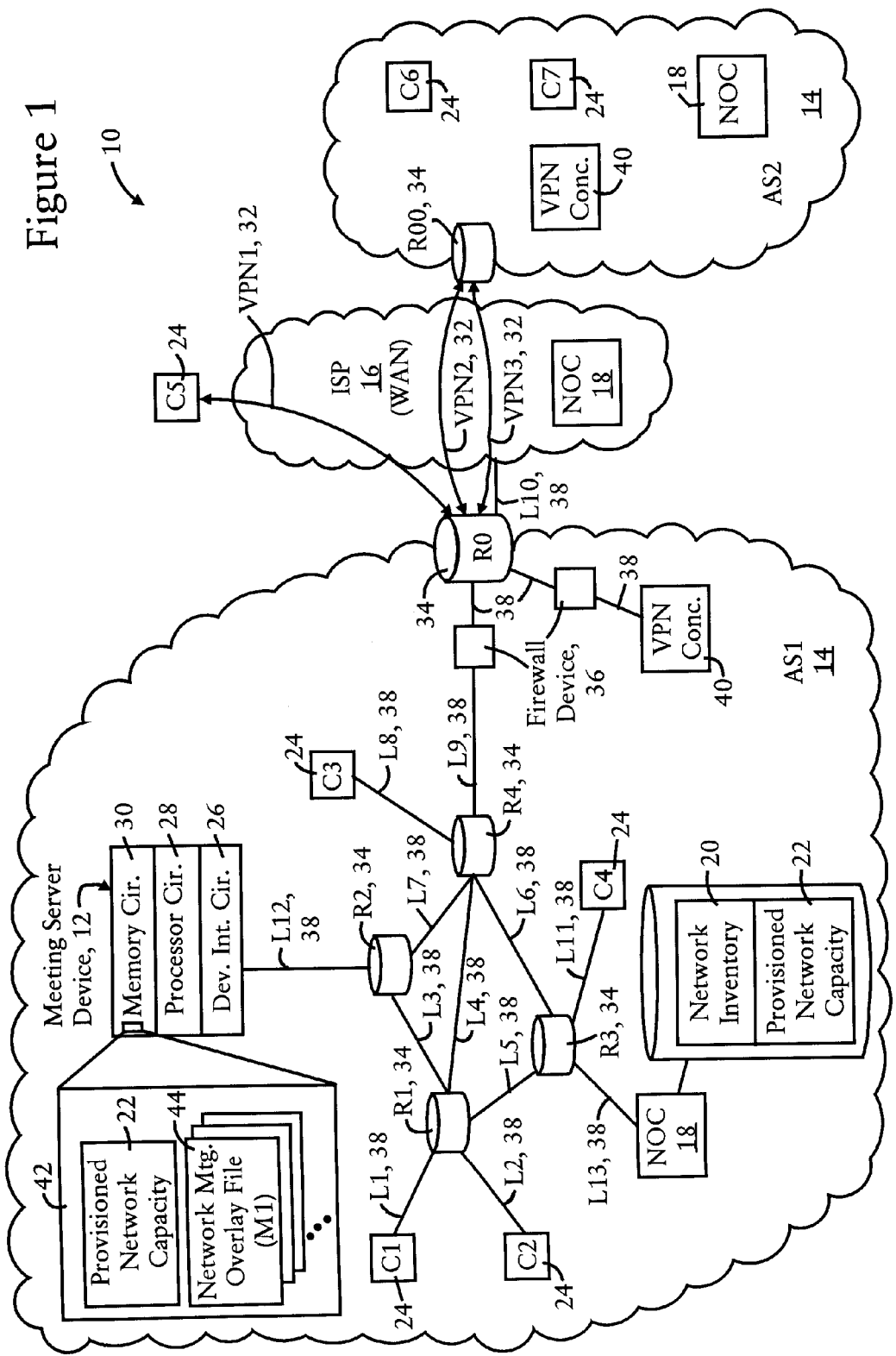
FIG. 1 illustrates an example system having a meeting server configured for selectively reserving identifiable network resources for a meeting event, from available network capacity, based on determining the network will have the available network capacity during the meeting event, according to an example embodiment.

In one embodiment, a method comprises receiving a request for scheduling a meeting event between client endpoint devices in an Internet Protocol (IP) based network, the meeting event having a starting time and duration, the meeting event requiring identifiable network resources from the network; determining whether the network will have available network capacity to supply the identifiable network resources during the meeting event; and selectively reserving the identifiable network resources for the meeting event, from the available network capacity, based on determining the network will have the available network capacity during the meeting event.

In another embodiment, an apparatus comprises a device interface circuit and a processor circuit. The device interface circuit is configured for receiving, in an Internet Protocol (IP) based network, a request for scheduling a meeting event between client endpoint devices in the network. The meeting event has a starting time and duration, and requires identifiable network resources from the network. The processor circuit is configured for determining whether the network will have available network capacity to supply the identifiable network resources during the meeting event. The processor circuit further is configured for selectively reserving the identifiable network resources for the meeting event, from the available network capacity, based on determining the network will have the available network capacity during the meeting event.

DETAILED DESCRIPTION

Particular embodiments enable identifiable network resources in a network to be dynamically reserved for a meeting event scheduled between client endpoint devices, at the time that the meeting event is scheduled. The identifiable network resources are dynamically reserved by a meeting server device (i.e., a network resource reservation device) in response to the meeting server device receiving a request for scheduling the meeting event, and based on the meeting server device determining the network will have available network capacity to supply the identifiable network resources during the meeting event. If the meeting server device determines the network will not have the available network capacity during the meeting event, the meeting server device can send a request for additional network capacity required for the meeting. The meeting server device can reserve the identifiable network resources in response to receiving a reply indicating the additional network capacity will be available for the meeting. Alternately, if the meeting server device determines the additional network capacity required for the meeting event will not be available, the meeting server device can recommend an alternative start time for the meeting event.

The meeting server device also can implement the meeting for the starting time based on deploying the identifiable network resources reserved for the event, for example based on sending commands to router devices or firewall devices in the network for initiation of the meeting event according to the reserved network resources and according to network policies established for the meeting event. The meeting server also can release the identifiable network resources back to the available network capacity, and/or return the additional network capacity (e.g., having been leased from an Internet Service Provider), in response to confirming the meeting event has ended.

Hence, network resources in a network can be scheduled and reserved according to calendar-based meeting event planning, based on comparing whether provisioned network capacity in the network will have available network capacity to supply the identifiable network resources required during the meeting event. Further, meeting event planning can include requesting additional network capacity on at least a temporary basis, where the identifiable network resources (and additional network capacity) can be released for reuse (or reclamation) in response to confirming the meeting event has ended.

FIG. 1 illustrates an example Internet Protocol (IP) based network 10, according to an example embodiment. The network 10 includes an autonomous system ("AS1") 14 containing a meeting server device 12. The autonomous system "AS1" 14 can be implemented based on deploying the meeting server device 12, router devices 34, firewall devices 36, and client devices 24 interconnected by data links 38. A router device 34 and a firewall device 36 also can be implemented within a single network device; hence, the router devices "R1", "R3", "R4" 34 each can include firewall device circuitry to implement enforcement of prescribed policies for the connected client devices "C1", "C2", "C3", and "C4" 24, described below. The meeting server device 12 can be configured for reservation of identifiable network resources for meeting events within the autonomous system "AS1" 14. The meeting server device 12 also can be configured for reserving identifiable network resources that extend outside of the autonomous system "AS1" 14, for example virtual private network (VPN) connections 32. As illustrated in FIG. 1, the autonomous system "AS1" 14 includes a VPN concentrator device 40 configured for establishing VPN connections (e.g., "VPN1", "VPN2", and "VPN3") 32.

The example network 10 can include a second autonomous system ("AS2") 14 and at least one Internet Service Provider (ISP) 16 that provides a wide-area network (WAN) reachability for the autonomous system ("AS1") 14 to reach the second autonomous system ("AS2") 14 and other client endpoint devices (e.g., "C5") 24. The Internet Service Provider 16 can be implemented as an incumbent local exchange carrier (ILEC), a competing local exchange carrier (CLEC), a cable television operator providing Internet access, etc. Hence, the network 10 provides reachability between the client endpoint devices (e.g., C1, C2, C3, C4, C5, C6, and/or C7) 24.

The Internet Service Provider 16 can be implemented as an Internet Access provider or a Network Service Provider (i.e., a Tier 1 network). The ISP 16 provides network access for the autonomous system "AS1" to a wide area network (e.g., the Internet) by provisioning one or more network access links "L10" 3 8 to the autonomous system "AS1" 14. The network access link "L10" 38 can be implemented as a fractional T1 data link (i.e., less than 1.544 Mb/s), one or more T1 data links (each T1 data link providing a 1.544 Mb/s data connection), a T3 data link (i.e., 43.232 Mb/s, equivalent to 28 T1 data links), or any combination thereof based on a contractual arrangement between the ISP 16 and the autonomous system "AS1" 14. As described below, the network access link "L10" 38 can be provisioned based on connecting multiple physical data links (e.g., T1) to the border router 34, where only a portion of the connected physical data links are activated by the ISP 16.

An "Autonomous System" (e.g., "AS1") 14 refers to a collection of Internet Protocol router devices (e.g., "R0", "R1", "R2", "R3", "R4") 34 under a single technical administration, using an interior gateway protocol (IGP) and common metrics to determine how to route packets within the Autonomous System (e.g. "AS1"), and using an inter-Autonomous System routing protocol (e.g., Border Gateway Protocol (BGP) to determine how to route packets to other Autonomous Systems (see, e.g., the Internet Engineering Task Force (IETF) Request for Comments (RFC) 4271 at Sec. 1.1). In this example, the router devices "R0", "R1", "R2", "R3", "R4" 34 within the autonomous system "AS1" 14 could exchange routing information according to an interior gateway protocol such as a distance vector routing protocol or a link state routing protocol; in contrast, the border routers "R0" and "R00" 34 could exchange routing information with routers in the ISP 16 according to BGP as described in the IETF RFC 4271.

As illustrated in FIG. 1, the autonomous systems "AS1" and "AS2" 14 and the ISP 16 each include a Network Management System, also referred to as a Network Operations Center (NOC) 18. Each network management system 18 is configured for maintaining a corresponding network inventory 20 of all network equipment that is deployed within the corresponding network 14 or 16, including deployed router devices 34, switching devices (not shown), active network links 38, server devices 12 or 40, etc. Hence, at least a portion of the network inventory 20 is deployed and assigned by the network management system 18 as provisioned network capacity 22 within the corresponding network 14 or 16. Hence, the provisioned network capacity 22 is the maximum capacity that is available for use within the corresponding network (e.g., "AS1") according to its existing configuration (i.e., its existing deployment). As described below with respect to FIG. 2, the provisioned network capacity 22 can change over time as additional network equipment is added to the network inventory 20, and/or as additional network equipment already in the network inventory 20 is provisioned and deployed in the corresponding autonomous system 14.

The meeting server device 12 is an apparatus (i.e., a machine) deployed within the autonomous system "AS1" 14. The meeting server 12 comprises a device interface circuit 26, a processor circuit 28, and a memory circuit 30.

Any of the disclosed circuits of the meeting server device 12 (including the device interface circuit 26, the processor circuit 28, and the memory circuit 30, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 30) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. The memory circuit 30 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 30 can be implemented dynamically by the processor circuit 22, for example based on memory address assignment and partitioning executed by the processor circuit 22.

Figure 2:
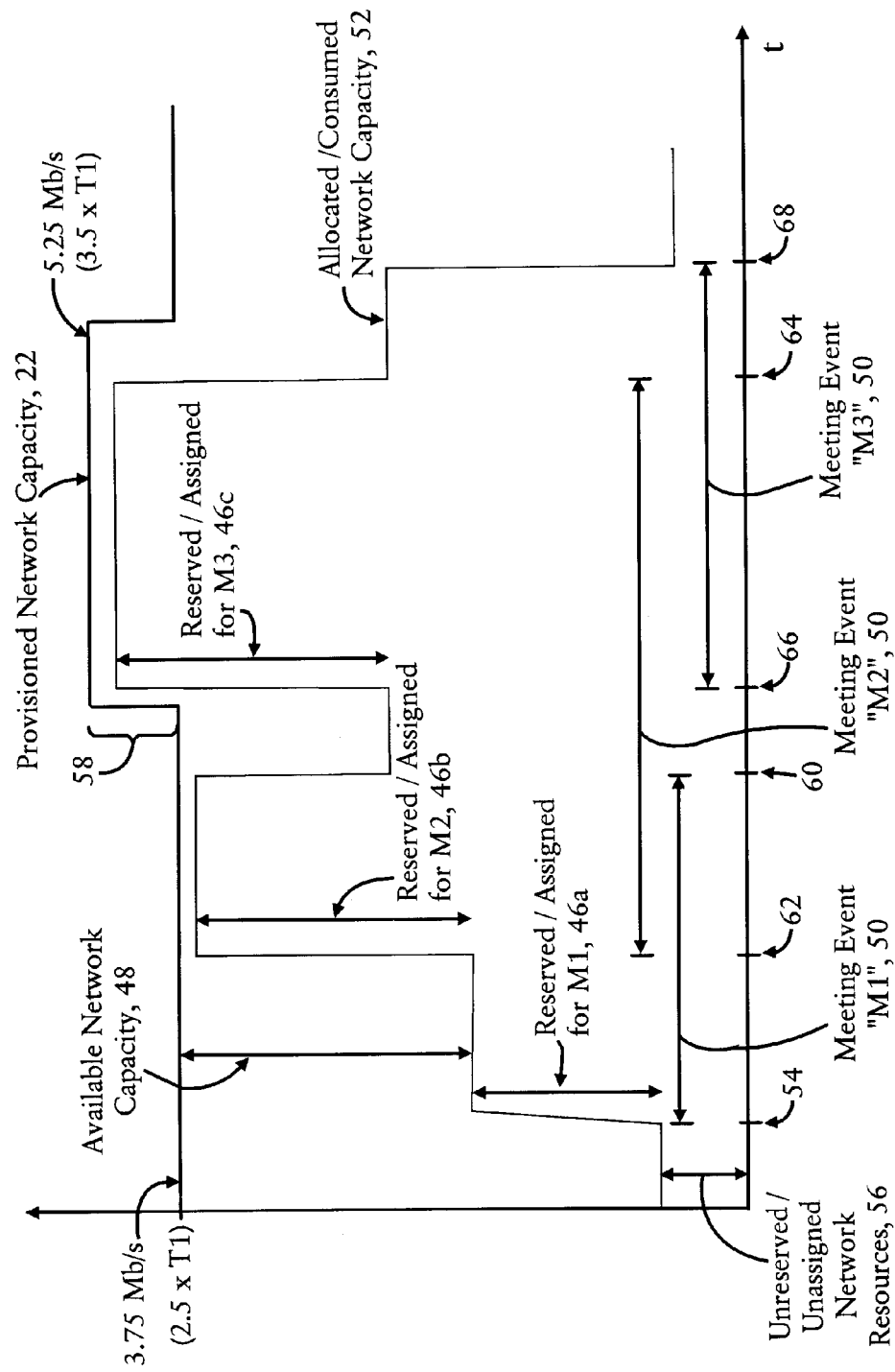
FIG. 2 illustrates the meeting server reserving identifiable network resources relative to provisioned network capacity and available network capacity, according to an example embodiment.

The meeting server device 12 is configured for responding to a request for scheduling a meeting event between client endpoint devices 24 based on determining whether the network 10 (or at least a portion thereof) will have available network capacity to supply the identifiable network resources during the meeting event. FIG. 2 illustrates the meeting server device 12 reserving identifiable network resources 46 relative to available network capacity 48 within the provisioned network capacity 22. The processor circuit 28 can reserve the identifiable network resources 46a required for a meeting event "M1" 50 based on determining the network 10 (or at least a portion of the autonomous system "AS1" 14) has the available network capacity 48 to supply the identifiable network resources 46a relative to the provisioned network capacity 22 and any other allocated network capacity 52. As illustrated in FIG. 2, the only allocated network capacity 52 at event 54 (coinciding with the start time of the meeting event "M1" 50) is low priority unreserved network resources 56 (e.g., low priority e-mail or web browsing traffic). As described below with respect to FIG. 3, the processor circuit 28 also can request additional network capacity 58 be added to the provisioned network capacity 22 in response to receiving a request for scheduling a meeting event: the request for additional network capacity 58 can be generated by the processor circuit 28 in response to the processor circuit 28 determining the network (10 or 14) requires the additional network capacity 58 to accommodate a meeting event, for example the concurrent implementing of the meeting events "M2" and "M3".

Hence, identifiable network resources can be selectively reserved for a meeting event at the time that the meeting event is scheduled, ensuring guaranteed deployment of bandwidth and quality of service requirements for the meeting event.

Figure 3:
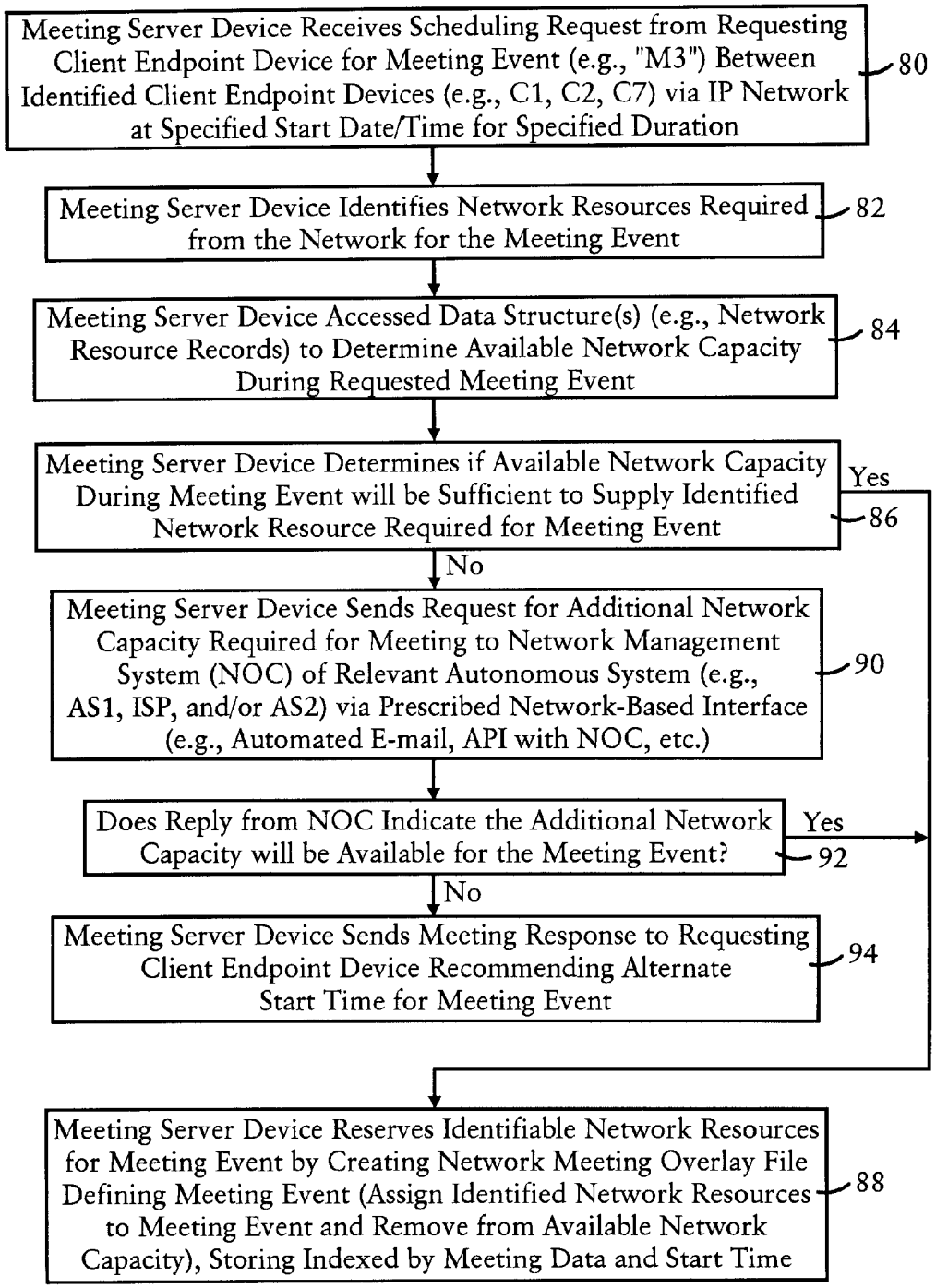
FIG. 3 illustrates an example method by the meeting server of FIG. 1 of reserving identifiable network resources for a meeting event, based on determining the network will have the available network capacity during the meeting event, according to an example embodiment.

FIG. 3 illustrates an example method by the meeting server device 12 reserving identifiable network resources 46 for a meeting event 50, according to an example embodiment. The steps described in FIGS. 3 and/or 5 can be implemented as executable code stored on a computer or machine readable tangible storage medium (e.g., floppy disk, hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

The device interface circuit 26 of the meeting server 12 is configured for receiving, via the data link "L12" 38 in step 80, a request for scheduling a meeting event (e.g., "M1") 50 between client endpoint devices (e.g., C1, C2, and C7) 24 within the network 10.

The request for scheduling a meeting event (i.e., "scheduling request") can be generated by one of the client endpoint devices 24, regardless of whether the client endpoint device 24 generating the request is to participate in the meeting event 50. The scheduling request also can be generated by a processor-based server device in the autonomous system "AS1" 14 (not shown) that executes a calender server program on behalf of the client endpoint devices 24, for example the commercially available Microsoft Exchange Server, IBM Lotus Notes, etc.

The scheduling request also can be used to reserve network resources for maintenance. For example, the scheduling request also can be generated by the NOC 18, for example if service personnel wish to perform network maintenance (e.g., reconfiguration, upgrades, repairs, testing, etc.) on an identified portion of the autonomous system "AS1" 14 (e.g., one or more routers 34, one or more links 38, one or more servers 40, etc.). In this example, the scheduling request generated by the NOC 18 could explicitly specify one or more network components (e.g., router "R1" 34, link "L4" 38, VPN concentrator 40, a specific firewall device 40, etc.).

The scheduling request can specify the start time and duration (and start date if on a different date), and the client endpoint devices 24 that are to participate in the meeting event 50. If needed, the scheduling request also can specify meeting type (e.g., video, audio, etc.), whether any data files need to be distributed to meeting participants, etc.; alternately, attributes describing the meeting can be obtained based on the scheduling request providing a reference to another data structure stored in the autonomous system "AS1" 14 that describes the identifiable network resources that are required for the event.

The processor circuit 28 of the meeting server device 12 is configured for responding to the scheduling request received in step 80 by determining in step 82 whether the network (e.g., "AS1" 14 or 10) will have available network capacity 48 to supply the network resources required for the meeting event from the autonomous system "AS1" 14, the ISP 16, and/or the autonomous system "AS2" 14. For example, assume the scheduling request is for the meeting event "M1" 50 and specifies a meeting time starting at event 54 of FIG. 2 at 8:00 AM on Dec. 18, 2008, between the client endpoint devices "C1", "C2", and "C3" 24 deployed exclusively within the autonomous system "AS1" 14. The processor circuit 28 can parse the scheduling request and identify in step 82 that the requested meeting event "M1" 50 will require Voice over IP connections and limited file transfer capabilities between the client endpoint devices "C1", "C2", and "C3" 24, implemented for example using 0.5 Mb/s bandwidth links providing a guaranteed voice quality grade quality of service between the client endpoint devices "C1", "C2", and "C3" 24. Hence, the processor circuit 28 can determine that the meeting event "M1" 50 requires 0.5 Mb/s guaranteed bandwidth and a voice quality grade quality of service for the data links "L1", "L2", "L4", and "L8" provided by the router devices "R1" and "R4" 34.

The processor circuit 28 determines in step 84 whether the network (e.g., "AS1" 14) will have available network capacity 48 to supply the identifiable network resources (identified in step 82) during the meeting event (e.g., "M1") 50. For example, the processor circuit 28 of the meeting server device 12 can access in step 84 a data structure 42 containing network resource records relevant to the duration of the meeting event 50 (i.e., between events 54 and 60 of FIG. 2). In particular, the processor circuit 28 can access the provisioned network capacity 22, illustrated as stored within the tangible data structure 42 stored in the memory circuit 30. Alternately, the tangible data structure 42 can be stored on another tangible storage device (e.g., a network-enabled hard disk drive) reachable by the device interface circuit 26. The processor circuit 20 also can access stored data structures 44 within the data structure 42, referred to as network meeting overlay files.

Each network meeting overlay file 44 defines a previously scheduled meeting event overlying the network 10 based on assignment of identifiable network resources for the corresponding meeting event 50; hence, each network meeting overlay file 44 defines the identifiable network resources that already have been reserved for the corresponding meeting event 50.

The processor circuit 28 compares in step 86 the starting time and duration of the meeting event (e.g., "M1") 50 specified in the meeting request with the provisioned network capacity 22 and any other meeting events scheduled for deployment concurrently with the requested meeting event. Assume for example that the scheduling request for the meeting event "M1" 50 is the first request received by the meeting server device 12, and that the only other allocated network capacity 52 is the unreserved low priority network resources 56 illustrated in FIG. 2. If the processor circuit 28 determines in step 86 that the network 10 will have available network capacity at the scheduled meeting time to supply the network resources required for the meeting event, the processor circuit 28 can generate in step 88 a new network meeting overlay file 44 that defines the new meeting event overlying the network (e.g., "AS1" 14), and reserve the identifiable network resources for the meeting event 50 based on specifying the identifiable network resources 46 in the new network meeting overlay file 44. Hence, using the example of the meeting event "M1" 50 requiring 0.5 Mb/s of network resources, the processor circuit 28 determines in step 86 that the relevant allocated network capacity 52 (for the unreserved network resources 56) at event 54 is 0.05 Mb/s, that the provisioned network capacity 22 at event 54 is 3.75 Mb/s; hence the available network capacity 48 at event 54 after accounting for the meeting event "M1" will be 3.20 Mb/s (i.e., 3.75 Mb/s minus 0.5 Mb/s minus 0.05 Mb/s). Hence, the processor circuit 28 determines in step 86 that the available network capacity 48 of 3.70 Mb/s at event 54 will be sufficient to supply the required 0.5 Mb/s of network resources for the meeting event "M1" 50.

Figure 4A:
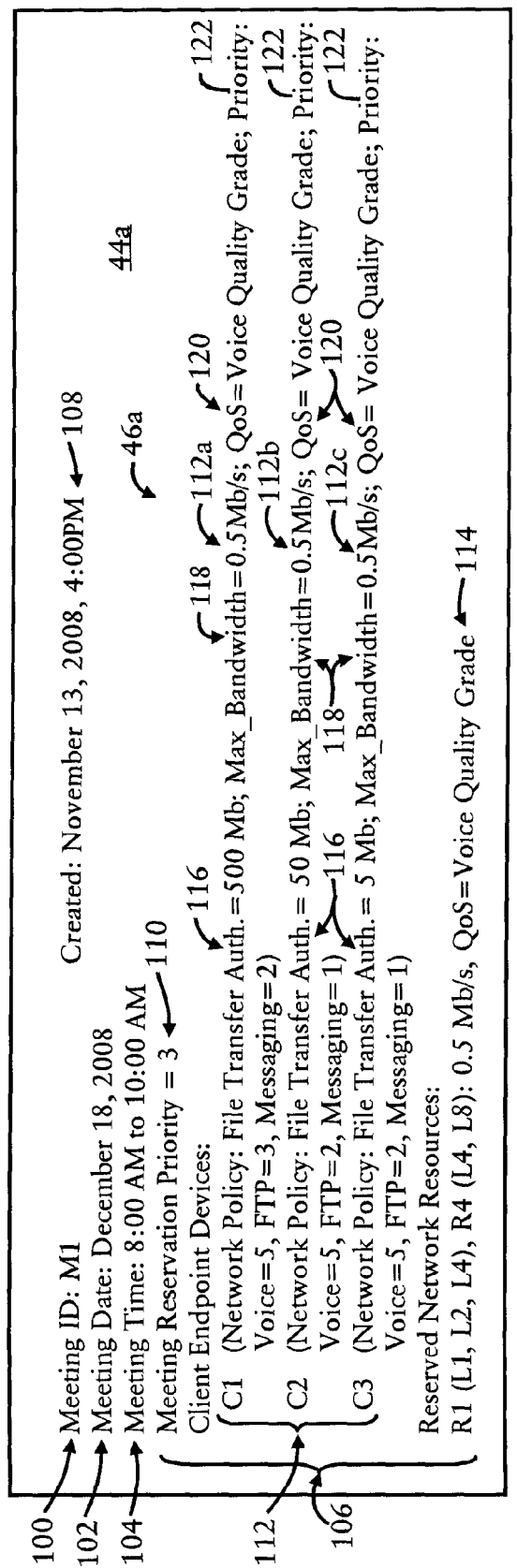
FIGS. 4A, 4B and 4C illustrate example network meeting overlay files that define respective meeting events overlying the network of FIG. 1 based on respective assignment of identifiable network resources, according to an example embodiment.

Hence, the processor circuit 28 reserves the identifiable network resources 46*a* for the meeting event "M1" 50 based on creating in step 88 the network meeting overlay file 44*a*, illustrated in FIG. 4A.

FIG. 4A illustrates the data structure 44*a*, also referred to as the network meeting overlay file, according to an example embodiment. The network meeting overlay file 44*a* created by the processor circuit 28 specifies a meeting identifier 100 that uniquely identifies the meeting event (e.g., "M1") 50. The processor circuit 28 also can be configured for specifying within the network meeting overlay file 44*a* a meeting date 102, a meeting starting time and duration 104 (illustrated for example as starting and ending times 8:00 AM to 10:00 AM). The processor circuit 28 also can be configured for specifying, within the network meeting overlay file 44*a*, network policies 106 of the identifiable network resources 46*a* that are to be enforced for the meeting event "M1" 50. The processor circuit 20 also can be configured for specifying a creation timestamp 108 that specifies the date and time that the network meeting overlay file 44*a* was created by the processor circuit 28. Hence, the creation timestamp 108 illustrates that the identifiable network resources 46*a* are reserved for the meeting event "M1" at the time the meeting is scheduled, guaranteeing the availability of the network resources 46*a* according to the network policies 106 at the time the meeting is to be implemented at its scheduled date and time.

The network policies 106 specified in the network meeting overlay file 44*a* can include a meeting reservation priority 110, client-specific meeting requirements 112 (e.g., 112*a*, 112*b*, and 112*c*), plus network device-specific meeting requirements 114.

The meeting reservation priority 110 can identify a relative priority of the meeting enabling higher priority meetings (e.g., having a priority value of "5") to preempt lower priority meetings (e.g., having a priority of "4" or lower).

The client-specific meeting requirements (e.g., 112*a*) can specify a file transfer authorization 116 specifying whether the corresponding client endpoint device (e.g., "C1") 24 is authorized to transfer data files, for example according to FTP protocol. The file transfer authorization 116 can specify a maximum file size (e.g., 500 Megabytes (Mb)), permissible file types (identifiable, for example based on MIME encoding, file extension naming such as ".pdf", ".ppt", ".txt", ".wav", ".mov"), etc.

The network policies 106 also can specify a bandwidth capacity 118 for the corresponding client endpoint device (e.g., "C1") 24, a guaranteed quality of service (QoS) requirement 120 for the corresponding client endpoint device 24 (e.g., voice quality grade quality of service required), and/or network traffic prioritization 122. The QoS requirement 120 can refer to implementing prescribed network parameters to minimize quality-adverse effects such as jitter, delay, dropped packets, latency, etc., in order to maintain prescribed quality constraints.

The network traffic prioritization 122 can identify the respective priorities the respective network traffic types during the meeting event 50. As illustrated with respect to the network meeting overlay file 44*a*, voice traffic has the highest priority ("5"), followed by files transferred according to the FTP protocol ("3" or "2"), with instant messaging traffic being assigned the lowest relative priority ("2" or "1").

The network meeting overlay file 44*a* also specifies network device-specific meeting requirements 114, enabling the processor circuit 28 to implement the meeting event "M1" 50 for the specified starting time 104 on the specified meeting date 102. The processor circuit 28 implements the meeting event "M1" 50 based on sending explicit commands to the network devices (e.g., the router devices "R1" and "R4" 34) in order to guarantee the reserved network resources for the meeting events "M1" 50, described in further detail below with respect to FIG. 5.

Referring to FIG. 3, assume that following the creation of the network meeting overlay file 44*a* for the meeting event "M1" 50 and storage in the data structure 42 in step 88, the device interface circuit 26 of the meeting server device 12 receives in step 80 another scheduling request from a client endpoint device 24 for scheduling a meeting event "M2" 50 having the starting time and duration 104 of 9:00 AM to 2:00 PM on Dec. 18, 2008, illustrated as starting event 62 and ending event 64 in FIG. 2. The scheduling request for the meeting event "M2" 50 also can specify the meeting event "M2" 50 is between the client endpoint devices "C4", "C5", and "C6" 24. As illustrated in FIG. 1, the client endpoint devices "C5" and "C6" are reachable via the wide-area network 16, requiring creation of encrypted VPN connections 32 by the VPN concentrator device 40 to ensure meeting security in compliance with corporate or regulatory policies.

The processor circuit 28 identifies the network resources required from the network 10 for the meeting event (or at least required from the autonomous system "AS1" 14) in step 82 (e.g., 2.75 Mb/s required for meeting event "M2" 50), and accesses in step 84 the provisioned network capacity data structure 22 and the network meeting overlay file 44a for the meeting event "M1". In particular, the processor circuit 28 retrieves the network meeting overlay file 44a based on detecting the meeting events "M1" and "M2" having concurrent requirements of network capacity between events 60 and 62. As described above, the allocated network capacity 52 as of event 62 is 0.55 Mb/s, where 0.5 Mb/s is reserved for the resources 46a of the meeting event "M1" 50, and 0.05 Mb/s is allocated for the unassigned network resources 56. Further, the provisioned network capacity 22 (e.g., for data link "L10" 38) from event 54 to event 60 is 3.75 Mb/s (e.g., data link "L10" is deployed using 2 T1 lines and one fractional T1 line (0.75 Mb/s) leased by the NOC 18 of the autonomous system "AS1" 14 from the ISP 16).

As illustrated in FIG. 2, the processor circuit 28 determines in step 86 that the available network capacity 48 during the meeting event "M2" starting at event 62 (e.g., 3.2 Mb/s) is sufficient to supply the identified network resources 46b that are required for the meeting event "M2" 50 (e.g., 2.75 Mb/s). Hence, the processor circuit 28 of the meeting server device 12 reserves in step 88 the identifiable network resources 46b based on creating a network meeting overlay file 44b, illustrated in FIG. 4B, that defines the meeting event "M2" overlying the network 10. Specifically, the network meeting overlay file 44a assigns the identifiable network resources 46b to the meeting event "M2" 50 to guarantee that the network resources 46b are reserved for the meeting event "M2" 50. As illustrated in FIG. 2, the concurrent reservation of the network resources 46a and 46b for the respective meeting events "M1" and "M2" results in an allocated network capacity 52 of 3.3 Mb/s, which is below the provisioned network capacity 48 between events 54 and 60 of 3.75 Mb/s.

Figure 4B:
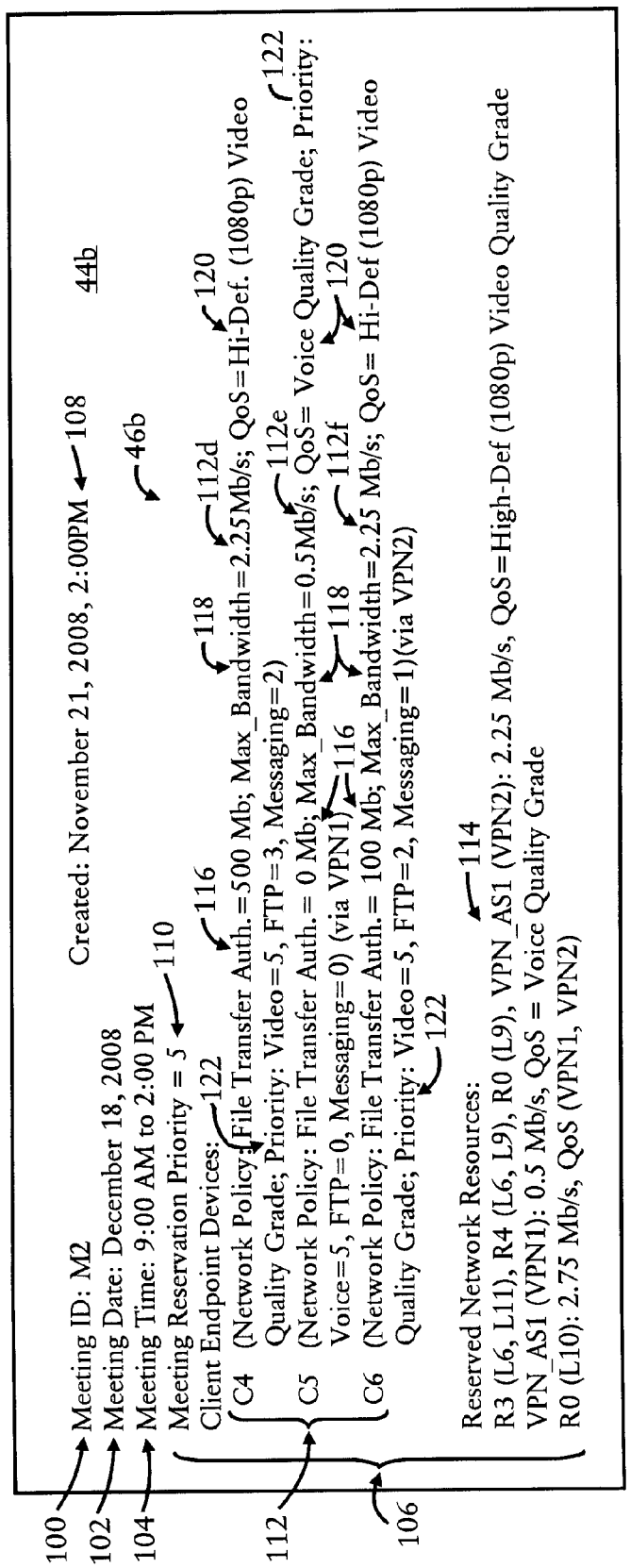

As illustrated in FIG. 4B, the network meeting overlay file 44b created by the processor circuit 28 in step 88 defines the meeting event "M2" 50 based on reservation and assignment of the identifiable network resources 46b to the meeting event "M2" 50. The network policies 106 specify bandwidth 118 and quality of service requirements 120 in order to guarantee high-quality video teleconferencing (e.g., 1080p-format high-definition television), using for example Cisco® TelePresence equipment deployed at the client endpoint devices "C4" and "C6" 24. In contrast, the bandwidth 118 and quality of service requirements 120 for the client endpoint device "C5" 24 specify a voice grade (e.g., Voice over IP) quality. Further, the network policies 112 and the network device-specific meeting requirements 114 identify the VPN connections "VPN1" and "VPN2" 32 to be established by the VPN concentrator device 40, as well as the relevant bandwidth and quality of service requirements for the respective VPN connections 32.

Hence, the storage of the network meeting overlay file 44b by the processor circuit 28 into the data structure 42 enables the processor circuit 28 to later implement the meeting "M2" 50 based on retrieving the corresponding network meeting overlay file 44b, and deploying the identifiable network resources 46b based on sending the appropriate commands to the network devices 34, 36, and 40.

Following storage of the network meeting overlay files 44a and 44b in the data structure 42 for the respective meeting events "M1" and "M2" 50, assume with respect to FIG. 3 that the device interface circuit 26 receives in step 80 a scheduling request from a requesting client endpoint device for a meeting event "M3" 50 between the client endpoint devices "C1", "C2", and "C7" having a start time and duration 104 of 1:00 PM to 2:30 PM on Dec. 18, 2008, illustrated in FIG. 2 by the start event 66 and the end event 68. Following identification of the network resources 46c required from the network 10 for the meeting event "M3" 50 in step 82 (e.g., 2.25 Mb/s required at least from link "L10" 38), the processor circuit 28 retrieves in step 84 the provisioned network capacity 22 (e.g., 3.75 Mb/s for at least the data link "L10" 38), and the network meeting overlay file 44b based on detecting the meeting events "M2" and "M3" having concurrent requirements of network capacity between events 64 and 66.

The processor circuit 28 determines in steps 84 and 86 that the available network capacity 48 (at least for the data link "L10" 38) prior to the starting event 66 for the meeting event "M3" is the difference between the allocated network capacity 52 of 2.8 Mb/s and the provisioned network capacity 22 of 3.75 Mb/s, resulting in an available network capacity 48 (at least on the data link "L10") of 0.95 Mb/s. Hence, the processor circuit 28 determines in step 86 that the network (e.g., the data link "L10" 38) will not have the available network capacity 48 of 2.55 Mb/s required during the meeting event "M3" 50.

In response to determining in step 86 that the available network capacity 48 (e.g., 0.95 Mb/s) will not be sufficient to supply the identifiable network resources (e.g., 2.25 Mb/s) 46c for the meeting event "M3" 50, the processor circuit 28 is configured for sending in step 90 a request for additional network capacity 58 that is required for the meeting event "M3" 50. The processor circuit 28 sends in step 90 the request for additional network capacity 58 (e.g., an additional T1 connection for the data link "L10" 32) to the network management system (NOC) 18 of the autonomous system "AS1" 14.

In one embodiment, the request for additional network capacity can be implemented in the form of an automated e-mail message that is sent to a prescribed destination within the NOC 18, where network provisioning equipment within the NOC 18 and under the control of network management personnel can negotiate with the NOC of the ISP 16 for leasing the additional network capacity 58 for at least the overlapping time interval between the events 64 and 66 of FIG. 2.

In another embodiment, the request for additional network capacity can be implemented using network-based application programming interfaces (APIs) executed by the processor circuit 28, and the NOCs 18 in the autonomous system "AS1" 14 and the ISP 16. In this example, the network provisioning equipment in the NOC 18 of the autonomous system "AS1" 14 can be configured for automatically responding to the request for additional network capacity 58, based on automatically sending the request to the NOC 18 of the ISP 18. The NOC 18 of the ISP 18 can be configured for automatically activating a connected T1 link between the border router "R0" and an access router (not shown) of the ISP 16, enabling the provisioned network capacity 22 to be dynamically increased by the additional network capacity 58, as required between the events 64 and 66.

The request for additional network capacity also can be sent by the processor circuit 28 to the NOC 18 of the autonomous system "AS2" 14, for example based on retrieving stored data structures identifying insufficient network capacity within the autonomous system "AS2" 14. The NOC 18 of the autonomous system "AS2" 14 can be configured to grant access to the meeting server device 12 of the autonomous system "AS1" 14, for example based on a trusted relationship between the autonomous systems "AS1" and "AS2".

If in step 92 the processor circuit 28 of the meeting server device 12 receives (via the device interface circuit 26) a reply from the NOC 18 of the autonomous system "AS1" 14 and/or the ISP 16 indicating that the additional network capacity 58 will not be available, the processor circuit 28 can generate in step 94 a meeting response to the requesting client endpoint device recommending an alternate start time for the meeting event, for example based on identifying from the data structure a time where there is available network capacity 48 to supply the required network resources 46c. Hence, a user can be notified at the time the scheduling request is generated if the required network resources are not available.

Figure 4C:
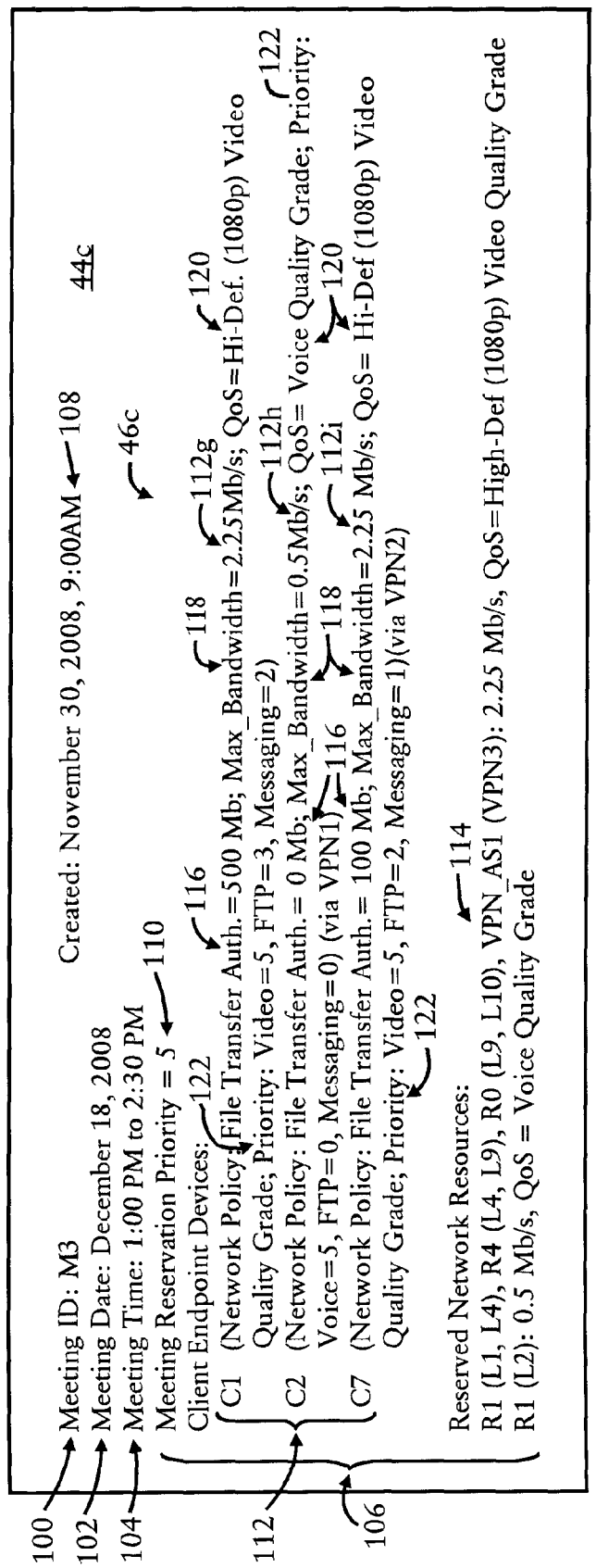

Assuming in step 92 that the processor circuit 28 receives a reply from the NOC 18 of the autonomous system "AS1" 14 and/or the ISP 16 indicating that the additional network capacity 58 will be available between the events 64 and 66, the processor circuit 28 can reserve in step 88 the identified network resources 46c for the meeting event "M3" 50 based on creating the network meeting overlay file 44c, illustrated in FIG. 4C.

As illustrated in FIG. 4C, the network meeting overlay file 44c created by the processor circuit 28 in step 88 defines the meeting event "M3" 50 based on reservation and assignment of the identifiable network resources 46c to the meeting event "M3" 50. The network policies 106 specify bandwidth 118 and quality of service requirements 120 in order to guarantee high-quality video teleconferencing (e.g., 1080p-format high-definition television), using for example Cisco® TelePresence equipment deployed at the client endpoint devices "C1" and "C7" 24. The bandwidth 118 and quality of service requirements 120 for the client endpoint device "C2" 24 specify a voice grade (e.g., Voice over IP) quality. Further, the network policies 112 and the network device-specific meeting requirements 114 identify the VPN connection "VPN3" 32 to be established by the VPN concentrator device 40, as well as the relevant bandwidth and quality of service requirements for the VPN connections "VPN3" 32.

Hence, the storage of the network meeting overlay file 44c by the processor circuit 28 into the data structure 42 enables the processor circuit 28 to later implement the meeting "M3" 50 based on retrieving the corresponding network meeting overlay file 44c, and deploying the identifiable network resources 46c based on sending the appropriate commands to the network devices 34, 36, and 40.

Hence, the creation and storage of the network meeting overlay files 44a, 44b, and 44c by the processor circuit 28 guarantees that the required network resources 46a, 46b, and 46c are reserved from the available network capacity 48, relative to the provisioned network capacity 22. In addition, the example embodiment demonstrates that the meeting server device 12 can request the additional network capacity 58, if needed, in order to increase the available network capacity to a level that is sufficient to supply the identifiable network resources required for a meeting event. Consequently, network capacity can be dynamically adjusted based on calendar-based scheduling of meetings 50 that require network resources.

Figure 5:
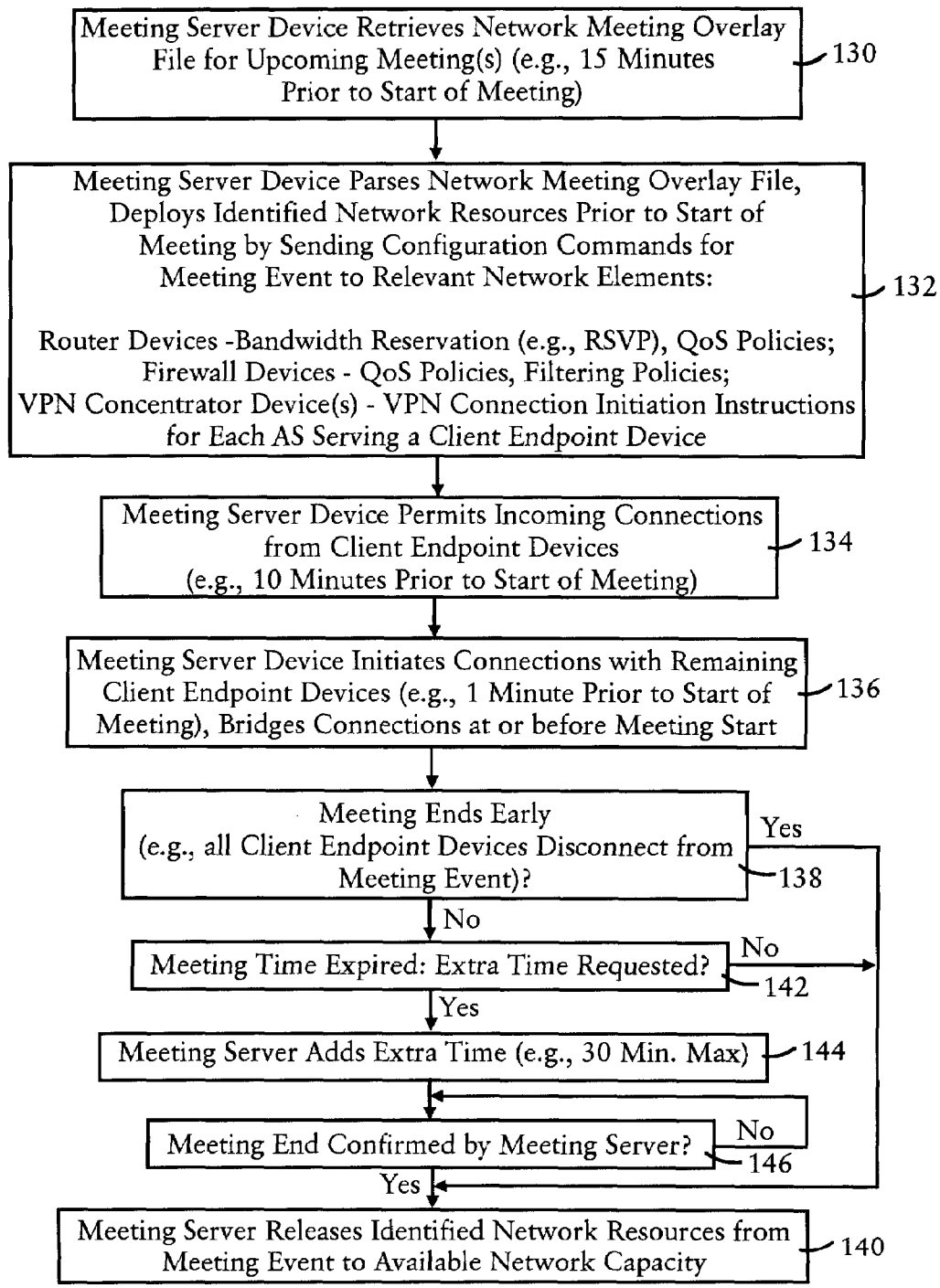
FIG. 5 illustrates an example method by the meeting server of FIG. 1 of implementing a meeting based on deploying the identifiable network resources specified in a network meeting overlay file, according to an example embodiment.

FIG. 5 illustrates an example method by the processor circuit 28 in the meeting server device 12 of implementing a meeting for a starting time, according to an example embodiment. The processor circuit 20 retrieves in step 130 a network meeting overlay file (e.g., 44a of FIG. 4A) for an upcoming meeting (e.g., the meeting event "M1" 50). In particular, the network meeting overlay files 44 can be indexed chronologically (i.e., according to meeting date and the meeting start time), enabling the processor circuit 28 to retrieve the relevant network meeting overlay file 44 with sufficient time to enable meeting participants to log into the meeting before the start time, if desired (e.g., 15 minutes prior to the start of the meeting).

The processor circuit 28 of the meeting server device 12 parses the network meeting overlay file (e.g., 44a), and implements the meeting 50 for the starting time beginning at event 54 based on deploying the identifiable network resources 46a in step 132. In particular, the processor circuit 28 can send configuration commands for the meeting event (e.g., "M1") 50 in step 132 to the relevant network elements. Example configuration commands include bandwidth reservation commands and quality of service policy commands that are sent to the relevant router devices (e.g., "R1" and "R4") 34, quality of service policy commands and filtering policy commands sent to firewall devices (e.g., implemented within the router devices "R1" and "R4").

In the case of implementing the meetings "M2" or "M3" based on retrieval of the respective network meeting overlay files 44b and 44c, the processor circuit 20 also can send commands to the VPN concentrator device 40 prior to the corresponding starting time, enabling the VPN concentrator device 40 to initiate a secure tunnel connection (e.g., a VPN connection 32) with a client endpoint device (e.g., "VPN1" for client endpoint device "C5" 24) or a peer VPN concentrator device 40 (e.g., "VPN2" and "VPN3" with VPN concentrator 40 in the autonomous system "AS2") via the peer border routers "R0" and "R00" 34. If a client endpoint device (e.g., "C5") 24 outside the autonomous system "AS1" 14 does not have a VPN resources necessary for VPN creation, the processor circuit 28 can add to the network meeting overlay file (e.g., 44b) an instruction for the VPN concentrator 40 to send a single-use or limited-time use (e.g., can use up to five times) VPN key to the client endpoint device "C5" 24, and to perform a pre-meeting test of the VPN connection "VPN1" 32. Hence, the processor circuit 28, in response to parsing the network meeting overlay file 44b, can send a command to the VPN concentrator 40 to ensure all client endpoint devices 24 invited to the meeting "M2" 50 are properly configured for establishing the required VPN connection 32.

In addition, security policies and/or quality of service policies can be sent by the processor circuit 28 in step 132 to the appropriate firewall devices 36 in order to enforce corporate or regulatory policy requirements during the relevant meeting 50.

The processor circuit 28 begins execution of the meeting in step 134 by permitting incoming connections from client endpoint devices 24 that are invited to the meeting at a prescribed time interval before the start of the meeting (e.g., 10 minutes prior to the start of a meeting 50). The incoming connections can be either TCP/IP connections for a web-based meeting, incoming Voice over IP connections for a voice conference call, and/or incoming video connections for a video conferencing system. If in step 136 there are any client endpoint devices 24 that have not yet established a connection with the meeting server device 12, the processor circuit 12 of the meeting server device 12 can initiate in step 136 the relevant connections (e.g., web-based, Voice over IP based, or video based) with the remaining client endpoint devices 24 invited to the meeting 50 (e.g., 1 minute prior to the start of the meeting), and bridge the connections either before or coincident with the scheduled beginning of the meeting at the prescribed start event (e.g., 54 for the meeting event "M1" 50).

The messaging server device 12 also can manage the identified network resources 46 that are assigned for the relevant meeting 50 as the meeting progresses. For example, if in step 138 the processor circuit 28 detects that the meeting ends early, where all the client endpoint devices 24 have disconnected from the meeting event, the processor circuit 28 can terminate the meeting by releasing in step 140 the identified network resources 46 from the meeting event 50 back to the available network capacity 48. The processor circuit 28 also can output messages in step 140 to the network devices (e.g., the router devices 34, the firewall devices 36, the VPN concentrator device 40, etc.) to cancel the configuration commands sent in step 132 for deployment of the meeting; alternately, the configuration commands sent in step 132 each can include a timer field that specifies a "lifetime" for the configuration command.

If in step 142 the processor circuit 28 detects that the prescribed meeting time has expired, the processor circuit 28 can send a query to one or more of the client endpoint devices 24 invited to the meeting 50 to determine if extra time is requested to continue the meeting. If extra time is requested, the processor circuit 28 can add additional time to the meeting in step 144 for up to a prescribed maximum (e.g., 30 minutes). In response to the processor circuit 28 confirming in step 146 that the meeting has ended (e.g., based on detecting all client endpoint devices have disconnected from the meeting event, or based on receiving a terminate instruction from one of the client endpoint devices), the processor circuit 28 can release the network resources 46 from the meeting event 50 back to the available network capacity 48 for reuse. The release of the network resources 46 can be implemented based on either deleting the relevant network meeting overlay file 44, or moving the network meeting overlay file 44 from the data structure 42 (used to calculate available network capacity 48) to another storage location for archived storage.

According to example embodiments, network resources can be dynamically allocated and reserved for future calendar-based meetings, where the availability of network resources required for a meeting event is compared at the time of scheduling the meeting with available network capacity that will be available at the time of the meeting event. Hence, the behavior of the network can be associated with calendar-based events, where the behavior of the network is based on network resource allocation relative to available network capacity and changing provisioned network capacity as needed to accommodate requirements for network resources.

Although the example embodiments illustrate that the single meeting server device 12 executes both the resource reservation illustrated in FIG. 3 and the meeting deployment in FIG. 5, a distributed architecture can be implemented where one or more meeting server devices 12 reserve identifiable network resources for meeting events according to FIG. 3, and another set of one or more meeting server devices 12 implement the meetings according to FIG. 5.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a meeting server, a request for scheduling a meeting event between client endpoint devices in an Internet Protocol (IP) based network, the meeting event having a starting time and duration, the meeting event requiring identifiable network resources from the network;

determining by the meeting server whether the network will have available network capacity, from provisioned network capacity relative to allocated network capacity, to supply the identifiable network resources during the meeting event;

sending by the meeting server a request for additional network capacity to be added to the provisioned network capacity, the additional network capacity required for the meeting event and sent in response to determining the network will not have the available network capacity during the meeting event; and selectively reserving, by the meeting server, the identifiable network resources for the meeting event, from the available network capacity, based on receiving a reply responsive to the request for additional network capacity and that indicates that the additional network capacity will be available for the meeting event.

2. The method of claim 1, further comprising responding to the request for scheduling the meeting event by sending a meeting response recommending an alternative start time for the meeting event, in response to a reply to the request for additional network capacity that indicates the additional network capacity required for the meeting event will not be available.

3. The method of claim 1, wherein the sending the request for additional network capacity includes sending the request for additional network capacity to a network management system via a prescribed network-based interface.

4. The method of claim 3, wherein:
the meeting server is deployed in a first autonomous system of the network;
at least one of the client endpoint devices is in a second autonomous system of the network, the second autonomous system reachable by the first autonomous system via an Internet Service Provider, the request for additional network capacity being sent to the network management system of at least one of the Internet Service Provider or the second autonomous system.

5. The method of claim 1, wherein the reserving includes creating a data structure stored on a tangible machine readable non-transitory storage medium, the data structure defining the meeting event overlying the network based on assigning the identifiable network resources to the meeting event.

6. The method of claim 5, wherein:
the data structure further identifies network policies of the identifiable network resources to be enforced for the meeting event, the network policies including at least one of file transfer authorization for at least one corresponding client endpoint device, bandwidth capacity for at least one corresponding client endpoint device, guaranteed quality of service requirements for at least one corresponding client endpoint device, or network traffic prioritization identifying respective priorities of network traffic types over the identifiable network resources during the meeting event;
the method further comprises sending a command to at least one firewall device prior to the starting time, the firewall device configured for enforcing at least one network policy of the identifiable network resources to be enforced during the meeting event, the at least one network policy identified in the data structure.

7. The method of claim 5, further comprising implementing the meeting event for the starting time based on deploying the identifiable network resources reserved for the meeting event, the implementing including sending a first command to a plurality of router devices prior to the starting time, the router devices configured for implementing at least a portion of the identifiable network resources among the client endpoint devices in response to the first command.

8. The method of claim 7, wherein the initiating further includes sending a second command to at least one network device prior to the starting time, the network device configured for initiating a secure tunnel connection with at least one of the client endpoint devices via the network at the starting time in response to the second command.

9. The method of claim 1, further comprising:
confirming the meeting event has ended; and
releasing the additional network capacity for reclamation in response to the confirming the meeting event has ended.

10. The method of claim 1, further comprising the meeting server implementing the meeting event for the starting time based on deploying the identifiable network resources reserved for the meeting event, the implementing including the meeting server initiating secure tunnel connections with client endpoint devices, and the meeting server enforcing policies to guarantee the identifiable network resources reserved for the meeting event.

11. An apparatus comprising:
a device interface circuit configured for receiving, in an Internet Protocol (IP) based network, a request for scheduling a meeting event between client endpoint devices in the network, the meeting event having a starting time and duration, the meeting event requiring identifiable network resources from the network; and
a processor circuit configured for determining whether the network will have available network capacity, from provisioned network capacity relative to allocated network capacity, to supply the identifiable network resources during the meeting event;
the processor circuit further configured for sending a request for additional network capacity to be added to the provisioned network capacity, the additional network capacity required for the meeting event and sent in response to the processor circuit determining the network will not have the available network capacity during the meeting event;
the processor circuit further configured for selectively reserving the identifiable network resources for the meeting event, from the available network capacity, based on receiving a reply responsive to the request for additional network capacity and that indicates that the additional network capacity will be available for the meeting event.

12. The apparatus of claim 11, wherein the processor circuit is configured for responding to the request for scheduling the meeting event by sending a meeting response recommending an alternative start time for the meeting event, in response to a reply to the request for additional network capacity that indicates the additional network capacity required for the meeting event will not be available.

13. The apparatus of claim 11, wherein the processor circuit is configured for sending the request for additional network capacity to a network management system via a prescribed network-based interface.

14. The apparatus of claim 13, wherein:
the apparatus is deployed within a first autonomous system of the network;
at least one of the client endpoint devices in a second autonomous system of the network, the second autonomous system reachable by the first autonomous system via an Internet Service Provider, the processor circuit configured for sending the request for the additional network capacity to the network management system of at least one of the Internet Service Provider or the second autonomous system.

15. The apparatus of claim 11, wherein the processor circuit is configured for reserving the identifiable network resources for the meeting event based on creating a data structure stored on a tangible machine readable non-transitory storage medium, the processor circuit configured for defining the meeting event overlying the network based on specifying, in the data structure, assignment of the identifiable network resources to the meeting event.

16. The apparatus of claim 15, wherein:
the processor circuit is configured for specifying, within the data structure, network policies of the identifiable network resources to be enforced for the meeting event, the network policies including at least one of file transfer authorization for at least one corresponding client endpoint device, bandwidth capacity for at least one corresponding client endpoint device, guaranteed quality of service requirements for at least one corresponding client endpoint device, or network traffic prioritization identifying respective priorities of network traffic types over the identifiable network resources during the meeting event;
the processor circuit configured for sending a command to at least one firewall device in the network prior to the starting time, the firewall device configured for enforcing at least one network policy of the identifiable network resources to be enforced during the meeting event, the at least one network policy identified in the data structure.

17. The apparatus of claim 15, wherein the processor circuit is configured for implementing the meeting event for the starting time based on deploying the identifiable network resources reserved for the meeting event, the processor circuit configured for sending a first command to a plurality of router devices prior to the starting time, the router devices configured for implementing at least a portion of the identifiable network resources among the client endpoint devices in response to the first command.

18. The apparatus of claim 17, wherein the processor circuit is configured for sending a second command to at least one network device in the network prior to the starting time, the network device configured for initiating a secure tunnel connection with at least one of the client endpoint devices via the network at the starting time in response to the second command.

19. The apparatus of claim 11, wherein the processor circuit is configured for confirming the meeting event has ended, and releasing the additional network capacity for reclamation in response to the confirming the meeting event has ended.

20. The apparatus of claim 11, wherein the apparatus is configured for implementing the meeting event for the starting time based on deploying the identifiable network resources reserved for the meeting event, the implementing including the apparatus initiating secure tunnel connections with client endpoint devices, and the apparatus enforcing policies to guarantee the identifiable network resources reserved for the meeting event.

21. An apparatus comprising:
a device interface circuit configured for receiving, in an Internet Protocol (IP) based network, a request for scheduling a meeting event between client endpoint devices in the network, the meeting event having a starting time and duration, the meeting event requiring identifiable network resources from the network; and means for determining whether the network will have available network capacity, from provisioned network capacity relative to allocated network capacity, to supply the identifiable network resources during the meeting event, the means for determining further configured for sending a request for additional network capacity to be added to the provisioned network capacity, the additional network capacity required for the meeting event and sent in response to the means for determining determining that the network will not have the available network capacity during the meeting event, the means for determining selectively reserving the identifiable network resources for the meeting event, from the available network capacity, based on receiving a reply responsive to the request for additional network capacity and that indicates that the additional network capacity will be available for the meeting event.

22. Logic encoded in one or more tangible non-transitory media for execution and when executed operable for:

receiving a request for scheduling a meeting event between client endpoint devices in an Internet Protocol (IP) based network, the meeting event having a starting time and duration, the meeting event requiring identifiable network resources from the network;

determining whether the network will have available network capacity, from provisioned network capacity relative to allocated network capacity, to supply the identifiable network resources during the meeting event;

sending a request for additional network capacity to be added to the provisioned network capacity, the additional network capacity required for the meeting event and sent in response to determining the network will not have the available network capacity during the meeting event; and selectively reserving the identifiable network resources for the meeting event, from the available network capacity, based on receiving a reply responsive to the request for additional network capacity and that indicates that the additional network capacity will be available for the meeting event.

* * * * *